United States Patent [19]
Walmsley

[11] Patent Number: 5,967,477
[45] Date of Patent: Oct. 19, 1999

[54] CLAMPS

[75] Inventor: Owen Walmsley, Chorley, United Kingdom

[73] Assignee: Robert Emmett, Blackburn, United Kingdom; a part interest

[21] Appl. No.: 08/190,618

[22] Filed: Jan. 3, 1994

Related U.S. Application Data

[63] Continuation of application No. 07/696,260, Apr. 30, 1991, abandoned, which is a continuation of application No. 07/356,672, May 3, 1989, abandoned, which is a continuation of application No. 07/099,671, Sep. 21, 1987, abandoned, which is a continuation of application No. 06/710,063, Mar. 11, 1985, abandoned.

[30] Foreign Application Priority Data

| Mar. 13, 1984 | [GB] | United Kingdom | 8406580 |
| Jun. 18, 1984 | [GB] | United Kingdom | 8415493 |
| Jul. 20, 1984 | [GB] | United Kingdom | 8418514 |

[51] Int. Cl.$^6$ .................................................. F16L 3/00
[52] U.S. Cl. ........................................ 248/230.2; 248/316.3
[58] Field of Search ................................ 285/105, 104; 248/230, 231.3, 316.3, 316.2, 230.2; 403/368

[56] References Cited

U.S. PATENT DOCUMENTS 2,182,797  12/1939  Dillon ................................ 285/104 X

FOREIGN PATENT DOCUMENTS

| 651556 | 4/1951 | United Kingdom . |
| 723281 | 2/1955 | United Kingdom . |
| 1478861 | 7/1977 | United Kingdom . |

*Primary Examiner*—Alvin Chin-Shue
*Attorney, Agent, or Firm*—William H. Holt; William R. Hinds

[57] ABSTRACT

A clamp comprises a tubular support having a number of axially spaced sets of angularly spaced apertures for receiving spheres engageable with the exterior of a pipe and with tapered surfaces on a clamp body. A spring urges the support down in relation to the body to cause the spheres to grip the pipe. Rams can raise the support to release the clamp, whereupon the spheres can enter recesses in the body. The apertures may be axially elongated to accommodate a degree of pipe ovality and have diverging walls for the same purpose. A form of the clamp for gripping a pipe interior is also described. The clamp may have one or more seals for sealing against the pipe and two oppositely acting clamps may form a connector for two pipes.

13 Claims, 8 Drawing Sheets

CLAMPS

This is a continuation of application Ser. No. 07/696,260 filed Apr. 30, 1991, abandoned, which is a continuation of Ser. No. 07/356,672 filed May 3, 1989, now abandoned, which is a continuation of Ser. No. 07/099,671 filed Sep. 21, 1987, now abandoned, which is a continuation of Ser. No. 06/710,063 filed Mar. 11, 1985, now abandoned.

According to this invention, a clamp for gripping elongate members, and capable of accommodating ovality of the elongate members, comprises a body having an axis and providing a surface inclined to the axis at an acute angle, movable elements which extend through apertures in a support for the elements for operative engagement with the inclined surface and with a generally axially extending surface of an elongate member such that in use the movable elements lie between the inclined surface and the elongate member surface for engagement therewith by radially opposite portions of the movable elements. The inclined surface is oriented such as to increasingly resist axially separating movement of the elongate member relative to the clamp body by exerting a wedging force against the movable elements into gripping engagement with the elongate member surface. The movable elements are in continuous contact with the inclined surface and the elongate member surface during gripping of the elongate member to the clamp body, the support being spaced from the body and from the elongate member. The apertures are shaped to permit both axial and radial movement of the elements relative to the support for accommodating ovality of the elongate member when the movable elements move relatively along the inclined surface into gripping engagement with the surface of the elongate member. The movable elements are free to move axially within the support apertures and relative to each other a sufficient amount such that the respective movable elements may adopt differing radial and axial positions when gripping the elongate member to accommodate such ovality.

There may be spring means for urging the movable element into engagement with the surface.

The body may define recesses for receiving the movable elements when not engaging the surface.

The elements may be spherical.

The support may be tubular and apertured to receive the elements.

The clamp may include a damping device pivotally connected to the body and the support and permitting a degree of movement of the body within the support.

The apertures may have diverging walls as viewed in longitudinal section.

At least one of the apertures may be of greater axial dimension than angular dimension.

The clamp may comprise axially spaced annular sealing means for engaging the member.

One of said seals may engage an inclined surface so that axial movement of the seal moves the seal radially inwards.

There may be a plurality of axially spaced sets of said movable elements, each set comprising a plurality of angularly spaced movable elements.

The body may provide two said surfaces movable elements and seals, said surfaces extending away from each other as they extend outwardly.

Also according to the invention a clamp for gripping an elongate member comprises a body providing a surface inclined to an axis, movable elements engageable with the surface and extending through a support for the elements for operative engagement with a surface of the member and sealing means engageable with the member.

The movable elements may extend through apertures in the support, which apertures are shaped to permit axial and radial movement of at least one of the elements for accommodating ovality of the member.

The invention may be performed in various ways and some specific embodiments with possible modifications will now be described by way of example with reference to the accompanying drawings, in which.

Figures 1, 1A, 1B:
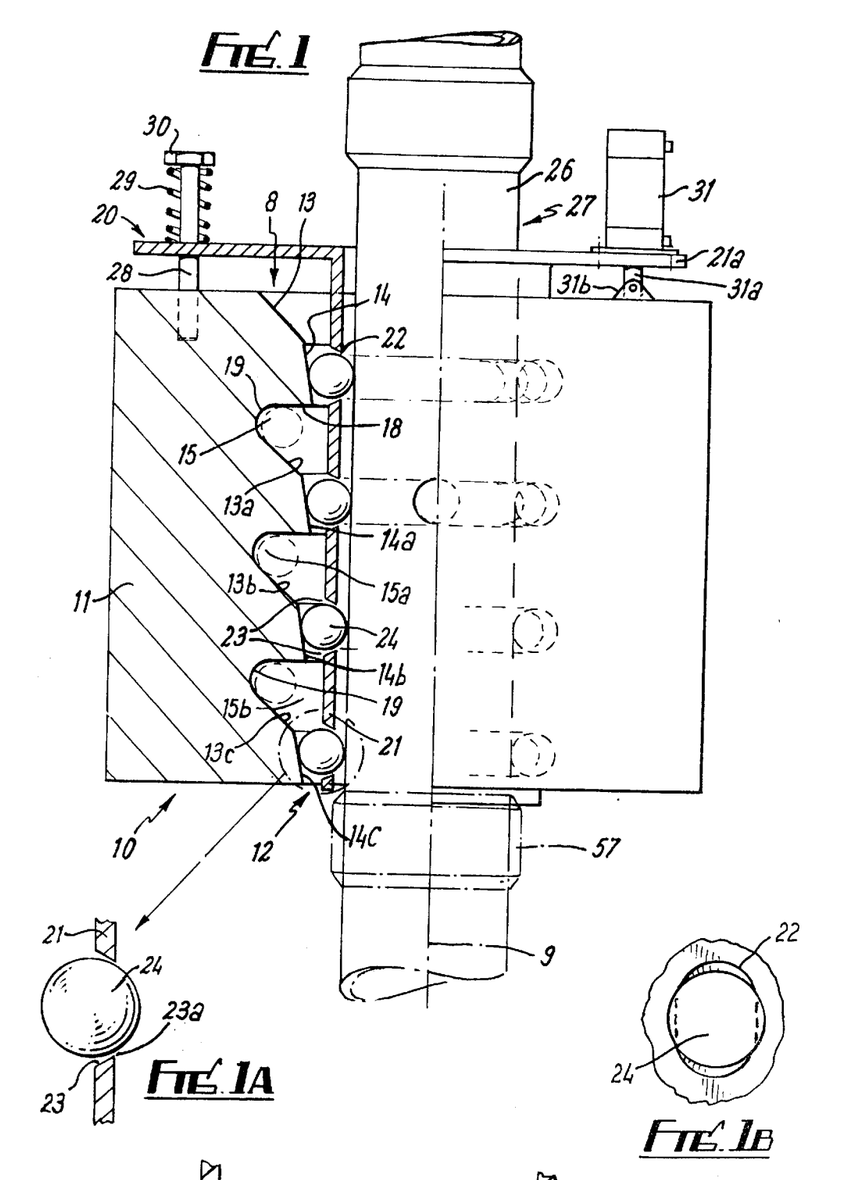
FIG. 1 is a half vertical section through a clamp or collet associated with a length of pipe.
FIG. 1A is an enlarged view of part of FIG. 1.
FIGS. 1B and 1D show a modification.

Referring to FIG. 1, a clamp or collet 10 comprises a body 11, for example of forged steel, in the form of a ring having a central longitudinal circular cross-section aperture 12 therethrough. Aperture 12 has at the upper end a first recess 8 providing tapered surface portion 13, which extends inwardly uniformly as it extends downwardly, leading to a second tapered surface portion 14 inclined inwardly at a smaller angle to the longitudinal axis 9 than the tapered portion 13. The tapered portion 14 leads to a radially enlarged recess 15 which has a lower tapered surface 13a similar to surface 13 which leads to tapered portion 14a similar to portion 14. Tapered portion 14a leads to recess 15a similar to recess 15, and so on. In the arrangement shown there are four recesses 8, 15 etc. and four tapered portions 14, 14a etc. There could be one, two, three or more than four, such sequential recesses and tapered surface portions, depending on particular uses. The upper surface 18 of recess 15 is at right angles to axis 9 and is connected to surface portion 13a by curved portion 19. The taper surfaces 14 etc. are case hardened.

A ball cage or support 20 comprises a tubular portion 21 extending in the aperture 12 and a flat horizontal top portion 21a. The portion 21 is parallel to axis 9. Portion 21 has a number of axially spaced rows of apertures 22, the apertures in each row being equiangularly spaced about the axis 9. Each aperture 22 is of circular section with the surface 23 defining the aperture 22 diverging uniformly as it extends radially outwardly. Each aperture 22 in the position shown receives a spherical ball 24, for example of hardened steel, the balls 24 engaging the outer surface 26 of a pipe 27 and the surfaces 14, 14a, 14b, 14c. The radially inner end of aperture 22 has a diameter less than the diameter of the associated ball 24.

A plurality of equi-angularly spaced bolts 28 are removably threaded into threaded bores in the upper part of the body 11 and extend through the flat cage portion 21*a*. Helical compression springs 29 extend between cage portion 21*a* and the heads 30 of the bolts 28 to urge the cage downwards, with balls 24 on surfaces 14, 14*a*, 14*b*, 14*c*. There may for example be twenty four balls in each set but there could be a different number, for example one, in which case the balls in the three sets would be equiangularly spaced.

Because the balls 24 engage tapered surfaces 14, 14*a*, 14*b*, 14*c* they are urged radially inwardly with a wedging action by downward movement of the cage 20 to grip firmly the surface 26 and prevent downward movement of the pipe 27. In this condition the upper edges of the apertures would engage the balls.

Figure 1C:
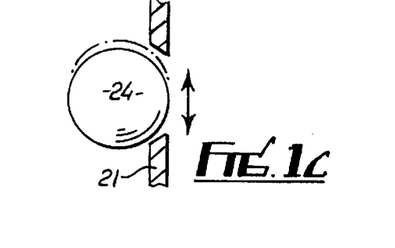
FIG. 1C shows another position.

If the cage 20 is moved upwards, the balls 24 move up the taper surfaces thus moving radially outwardly and may respectively move into recesses 8, 15, 15*a*, 15*b*, so that the pipe 26 is no longer clamped. In this condition the lower edges of the apertures would engage the balls. A radial clearance is shown at 23*a* between the illustrated balls and the radially inner ends of the apertures. Depending on pipe diameter the balls may adopt differing radial and axial positions and the diverging wall 23 enhances the possibility of such movement and enables the clamp to accommodate a degree of ovality in the pipe cross-section, which ovality may be localised. This is shown in FIG. 1C. Dependent on the radial clearance between the pipe and sleeve 21 a degree of ovality can be accommodated whilst retaining all the balls as gripping elements.

Figures 4, 4A, 4B, 4C:
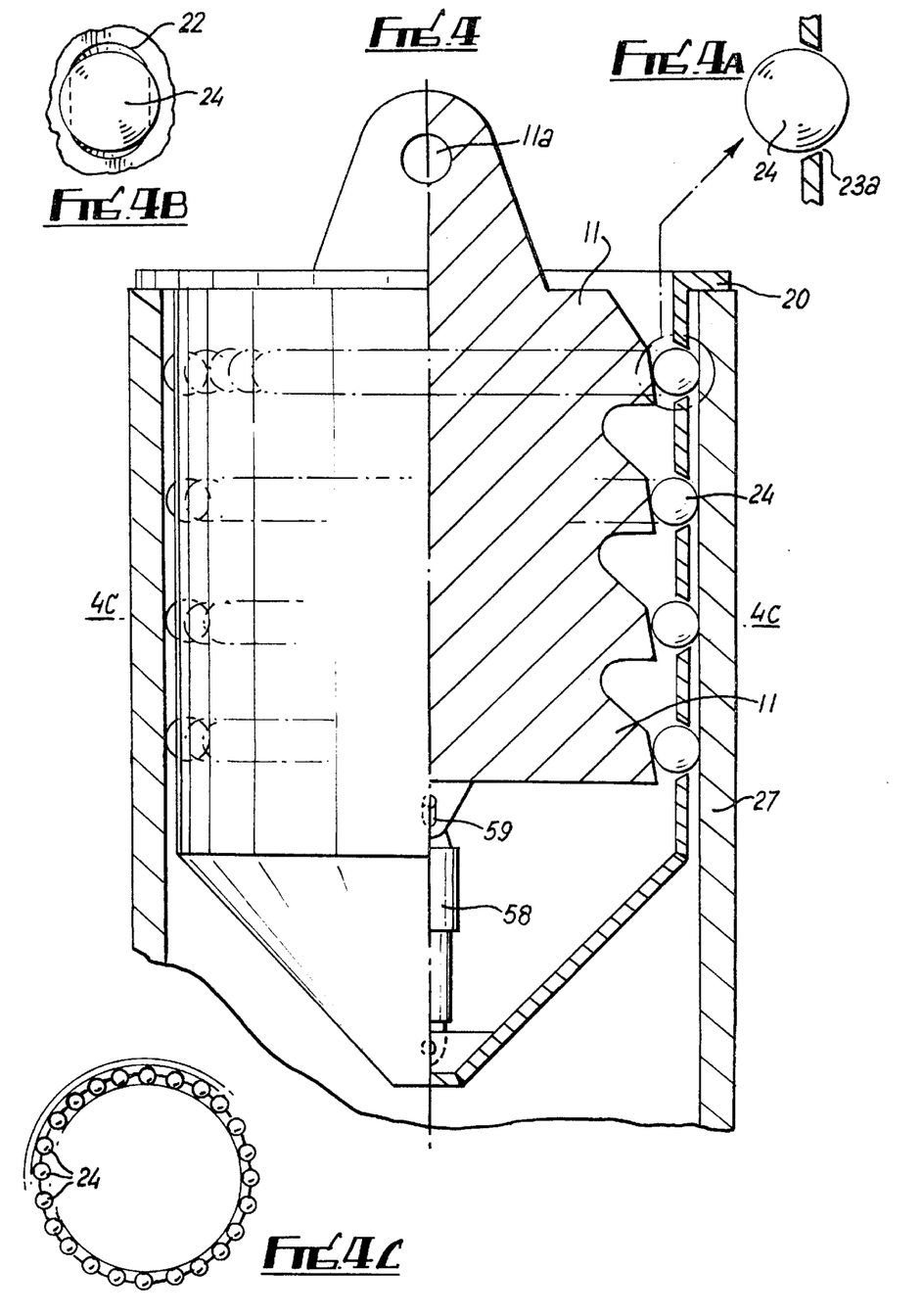
FIG. 4 is a half vertical section of an internal clamp.
FIGS. 4A and 4B are similar to FIGS. 1A and 1B.
FIG. 4C shows a simplified section.

In order better to accommodate a degree of ovality in the pipe, particularly large diameter pipes e.g. 90 cm, where a given tolerance in diameter means a greater ovality, the apertures 22 may be axially elongated so as to form a parallel sided slot, as seen in FIGS. 1B and 4B in which case all the balls may grip simultaneously. The axial dimension would depend on the angle of inclination to the axis of the taper surfaces 13, 13*a*, 13*b*, 13*c* and the amount of ovality it is desired to accommodate. The angle of inclination can be different in different embodiments. For example the angle of inclination could be between 4° and 20°. The smaller the angle the greater the radial loading for a given downward load.

The ovality may be caused in manufacture of the pipe or subsequently.

The cage 20 can be moved up or down to engage or disengage the wedge by a plurality of angularly spaced hydraulic cylinder/piston rams 31, in addition to the effect of gravity. The pistons 31*a* of the rams 31 are connected to the portion 11 conveniently through pivotal connection 31*b*, and the cylinder body of the ram 31 is connected to plate 21*a* by a flange connection.

In a modification the recesses 8, 15, 15*a*, 15*b*, are omitted. In one arrangement the balls 24 effect a gripping action under gravity i.e. the springs 29 could be omitted.

Because of the diverging shape of surface 23 the surface 23 may tend to roll the associated ball which may be helpful in some circumstances.

The balls 24 will be wedged between the pipe 27 and the tapered surfaces under the action of gravity. Because of the effect of gravity, the pipe 27 will move downwards. Friction between the balls and the pipe will cause the balls to roll down the tapers and thus apply a radial load to grip the pipe 27 and prevent any further downward movement of the pipe. The clamp is thus self-engaging which is to be contrasted with a hydraulically-engaged wedge which requires an external power source.

The springs 29 could be replaced by hydraulic rams, for example the rams 31 could be modified so as to be capable of being energized to assist the gripping of the clamp.

In a modification, the balls 24 are arranged to engage the interior surface of a pipe. Thus the portion 21*a* is radially inwards of cage 21 and the tapered surfaces are formed on the exterior of body 11 which is arranged to extend into the pipe.

One use of the clamp 10 is in the oil industry, specifically drilling.

Figure 3:
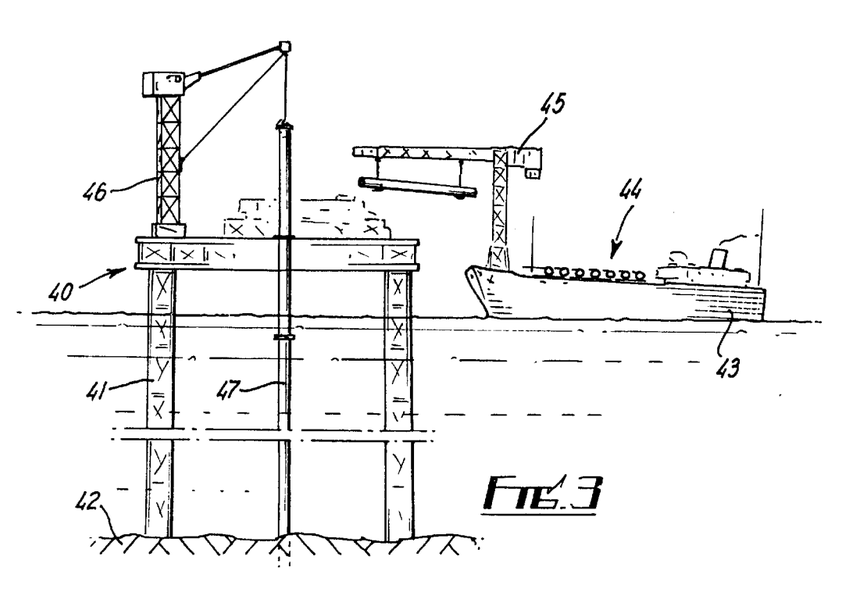
FIG. 3 is a diagrammatic view of an oil drilling arrangement.

In a known method of drilling, a platform 40 FIG. 3 includes legs 41 resting on the sea bed 42. A barge 43 carries lengths 44 of pipe or drill casing and a large crane 45 for transferring the casing lengths 44 to the platform 40. A large crane 46 is mounted on the platform and holds the assembled lengths of drill casing 47. A drill extends down the inside of the casing 47. The crane 46 must be sufficiently large to support or hold the entire length of casing 47.

With the present arrangement as described below, the crane 46 can be reduced in size.

A device 50 (FIG. 2) as shown in FIG. 1 has its body 11 fixed to the top of platform 40. Mounted on plate 21 are a plurality of equi-angularly spaced hydraulic rams/cylinders 51 (only two shown in FIG. 2). The cylinders 51 are pivoted to plate 21 at 52. The pistons 53 are pivoted at 54 to brackets 55 at the bottom of the body of a device 60 the same as the device 50 and the device 10. Fixed to the top of the device 60 is a clamp device 70 the same as devices 60, 50, 10 but inverted. Device 70 thus resists upward movement of the casing. Cylinders 51 (and cylinders 31 of each clamp device) are connected to suitable sources of pressure fluid e.g. pumps.

Figure 2:
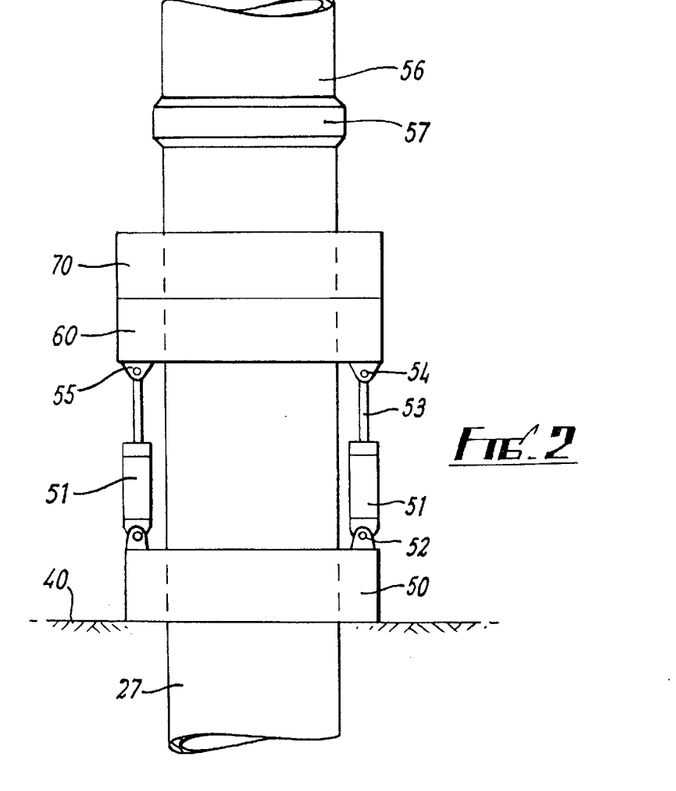
FIG. 2 is a side elevation showing clamps of FIG. 1 in association with a pipe.

In FIG. 2 a new length 56 of casing is being added to the existing casing, using known casing connector 57 on casing length 27. When connecting length 56 to connector 57, the cylinders 31 of clamp device 50 are energized so that the balls 24 of device 50 clamp the length 27 and support the assembled casing lengths. Devices 60, 70 may also be clamped. When the connector 57 is to pass through devices 50, 60, 70 their cylinders 31 are energized as required to move their respective balls 24 into the recesses 8, 15, 15*a*, 15*b*, to unclamp the pipe and allow the connector 57 through. At all material times the assembled casing is held in one or more of the clamps. In the present case the clamp devices may assist in movement of the casing.

To feed the casing or pipe upwards, devices 50, 60 are used, device 70 being unclamped. Device 60 is clamped against the pipe and rams 51 are energized to move the clamped pipe and device 60 upwards, the device 50 being unclamped. Device 50 is then clamped to hold the pipe, device 60 is unclamped, and rams 51 lowered to lower devices 60, 70.

Device 60 is then clamped, device 50 is then unclamped, rams 51 are extended to raise the pipe, and so on.

To feed the pipe down under its own weight, device 70 is unclamped and devices 50, 60 are used. In FIG. 2 the rams 51 are in extended position. Device 50 is in unclamped condition and device 60 is in clamped condition to carry the weight of the lengths of assembled casing. The rams 51 are then retracted to lower the pipe with devices 60, 70.

Device 50 is then brought to clamped condition to hold the pipe, device 60 is then unclamped, the rams 51 are then extended to raise devices 60, 70, device 60 is then brought to clamped condition, and so on.

To push the pipe downwards in addition to its own weight, devices 50, 60 are unclamped and device 70 is clamped. Rams 51 are in lowered (retracted) condition.

Clamp 50 is then engaged, clamp 70 is then disengaged, rams 51 are then extended to raise devices 60, 70 whilst clamp 50 holds the casing, clamp 70 is then re-engaged, clamp 50 is then disengaged, the rams 51 are then retracted to lower devices 60, 70 and the casing, and so on.

To clamp a pipe connector 57 onto a length of pipe or casing, clamp 60 is disengaged. The pipe 27 is held in clamp 50 and is in a position such that connector 57 is on pipe 27 and between devices 60, 50. The new pipe length 56 is held in clamp 70 and rams 51 are then retracted to lower the end of pipe length 56 into the connector 57.

It will be understood that connector 57 (shown in chain-dotted in FIG. 1) can move freely upwardly in devices 50, 60 because it displaces the balls 24 outwardly but it cannot move downwardly through the ball cage 21 unless the rams 31 are energized to raise the cage. For inverted device 70, the connector 57 can move freely downward but not upwardly.

Instead of cylinders 31, a screw device can be used for example manually operated.

When used in drilling, the clamp device or devices may be used to grip the drill string, or the casing through which the drill string may extend. In some cases the drill bit is carried on the casing.

It will be understood that the pipe or casing could be rotated whilst being supported by the clamp or clamps against axial movement.

FIG. 4 shows an internal form of the clamp, which is self-engaging and self-dis-engaging. On being lowered, the ball cage 20 enters the pipe 27 and allows the body 11 to move down and the balls 24 to retract radially inwards. The load is then slowly applied by raising body 11 and the pipe gripped by the balls 24 which are moved outwards. On dis-engagement, the load is removed and the body 11 moves down as before. The clamp is then quickly removed and dis-engaged. A hydraulic damper 58 pivoted to cage 20 and body 11 is attached to the body and cage by pins one of which is engaged in an axial slot 59 and allows a certain amount of free movement of the body 11 within the ball cage 12. The damper acts as a time delay 58. Thus, when it is desired to release the pipe, the body 11 is lowered, compressing the damper 58, and the balls 24 move inwards releasing the grip. Before the damper 58 can return to its extended datum position the whole clamp is lifted out of the end of the pipe or casing.

The clamp has a lifting eye 11a.

Typical use of the clamp FIG. 4 is for the automatic stacking of drill pipes or for the handling of drill casings, making the use of pad eyes and hydraulic clamps unnecessary.

In another internal form of clamp the arrangement of FIG. 4 is provided with springs 29 and rams 31 as in FIG. 1. Dependent on the radial clearance between the pipe and sleeve 21 a degree of ovality can be accommodated whilst retaining all the balls as gripping elements.

In order better to accommodate a degree of ovality in the pipe particularly large diameter pipes e.g. 90 cm, where a given tolerance in diameter means a greater ovality, the apertures 22 may be axially elongated so as to form a parallel sided slot, as seen in FIGS. 1B and 4B in which case all the balls may grip simultaneously. The axial dimension would depend on the angle of inclination to the axis of the taper surfaces 13, 13a, 13b, 13c and the amount of ovality it is desired to accommodate. The angle of inclination can be different in different embodiments. For example the angle of inclination could be between 4° and 20°. The smaller the angle the greater the radial loading for a given downward load.

The ovality may be caused in manufacture of the pipe or subsequently.

Figure 5:
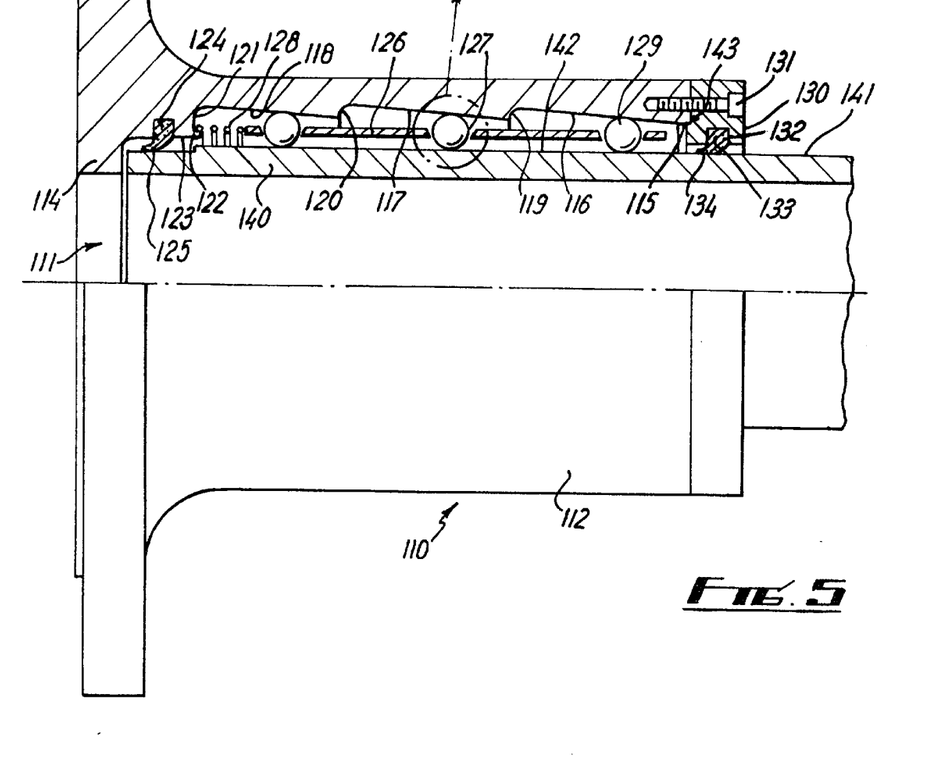
FIG. 5 is an axial longitudinal section through a pipe connector and pipe.
Figure 5A:
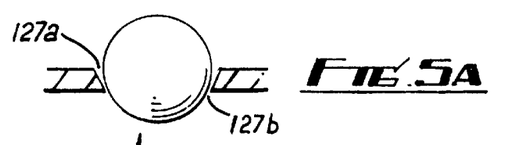
FIG. 5A is part of FIG. 5 on an enlarged scale.
Figure 5B:
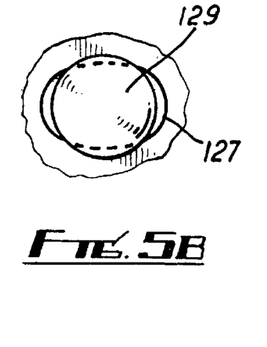
FIG. 5B shows a modification.
Figure 5C:
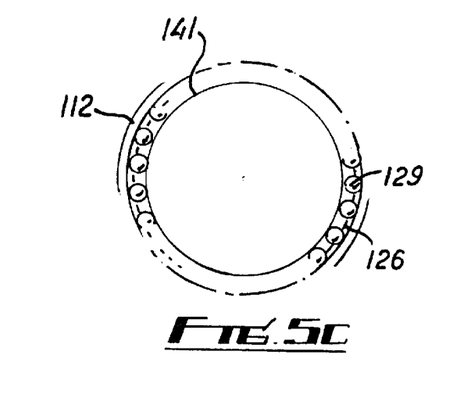
FIG. 5C is a simplified transverse section.

Referring to FIGS. 5, 5A and 5C, a pipe connector or pipe clamp 110 has a through-bore 111 having a central axis and comprises a cylindrical part 112 having at one end a radially outer annular flange 113 and a radially inner annular flange 114. The surface of the bore 111 has at the axial outer end a short length 115 of uniform diameter, three successive portions 116, 117, 118 which extend radially outwardly as they extend axially inwardly connected by curved portions 119, 120, 121, the portion 121 leading to an axially outwardly facing lip 122 leading to an axial portion 123 leading to the flange 114. The portion 123 has an annular groove for receiving an annular seal 124 having a flexible inner part 125.

A cylindrical housing or cage 126 has three axially spaced sets of apertures 127, each set comprising a plurality of equiangularly spaced apertures, for example twenty four apertures. The side walls 127a of the apertures 127 diverge at a uniform angle, as they extend radially outwardly. A helical spring 128 engages over the lip 122 and urges the cage 126 axially away from the flange 114. Each aperture 127 receives a spherical ball 129. The apertures 127 are circular and the radially inner diameter is less than the diameter of the respective ball 129. The balls in the respective sets of apertures engage bore surfaces 119, 120, 121. After insertion of the spring, cage and balls into the cylindrical part 112 an annular end cap 130 is attached to the axially outer free end of the part 112 by angularly spaced bolts 131. The end cap 130 has an annular groove 132 in its radially inner surface and this receives an annular seal 133 having a flexible inner part 134.

The flange 113 has angularly spaced apertures 135 by which it may be bolted to a supporting structure. An annular seal 143 in the axially inwardly face of the end cap engages the axially outwardly facing end of the cylindrical part 112.

In use, an end 140 of a pipe 141, whose inner diameter in the example shown is the same as that of the flange 114 but could be smaller or larger, is pushed into the connector 110 until the end of the pipe abuts a stop which in the example shown is the flange 114. During this movement the seal parts 125, 134 are deflected and sealingly engage the outer surface 142 of the pipe 141 to form pressure-tight seals. The balls 129 engage the surface 142 and, by friction are moved axially and outwardly in contact with portions 119, 120, 121 and against the action of the spring 128. The pipe 141 is now held by the spring 128 urging the balls 129 into engagement with the taper surfaces 116, 117, 118 and the pipe surface 142 and this force is sufficient to resist axial separating movement of the pipe from the connector. In general the pipe can only be removed by removing the end cap 130 and using a tool to push the cage 126 to compress the spring 128 and move the balls 129 radially outwardly.

In a normal working condition there is a clearance 127b between the radially inner end of the aperture wall 127a and the respective ball 129.

In a modification, portions 120 and/or 121 and associated balls 129, are omitted so that there may be one, two, or more than three sets of balls and associated tapered surface, the balls being suitably angularly spaced.

Instead of the or each tapered surface being annular, they may be local tapers machined individually for cooperation with the respective ball, the individual taper surfaces being spaced angularly around the bore or axis.

Dependent on the radial clearance between the pipe and sleeve 126 a degree of ovality can be accommodated whilst retaining all the balls as gripping elements as described with reference to FIG. 1C. There may be localized peaks or ovalities which can be accommodated by axial and radial movement of one or more balls.

Figure 1D:
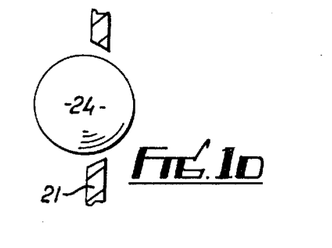

In order better to accommodate a degree of ovality in the pipe particularly large diameter pipes e.g. 90 cm, where a given tolerance in diameter means a greater ovality, the apertures 127 may be axially elongated so as to form a parallel sided slot, as seen in FIGS. 1B and 1D in which case all the balls may grip simultaneously. The axial dimension of the aperture would depend on the angle of inclination of the taper surfaces to the axis and the amount of ovality it is desired to accommodate. The angle of inclination can be different in different embodiments. For example the angle of inclination could be between 4° and 20°. The smaller the angle the greater the radial loading for a given downward load.

The ovality may be caused in manufacture of the pipe or subsequently. The surfaces 116, 117, 118 are preferably case hardened. In some embodiments the spring is omitted. In some embodiments, seal 133 is omitted.

In one arrangement flange 114 is omitted, and seals 143, 133, cap 130 and bolts 131 are omitted.

There could be only one ball for each tapered surface, in which case the balls would be equi-angularly spaced as viewed axially, or a number other than twenty four.

Figure 6:
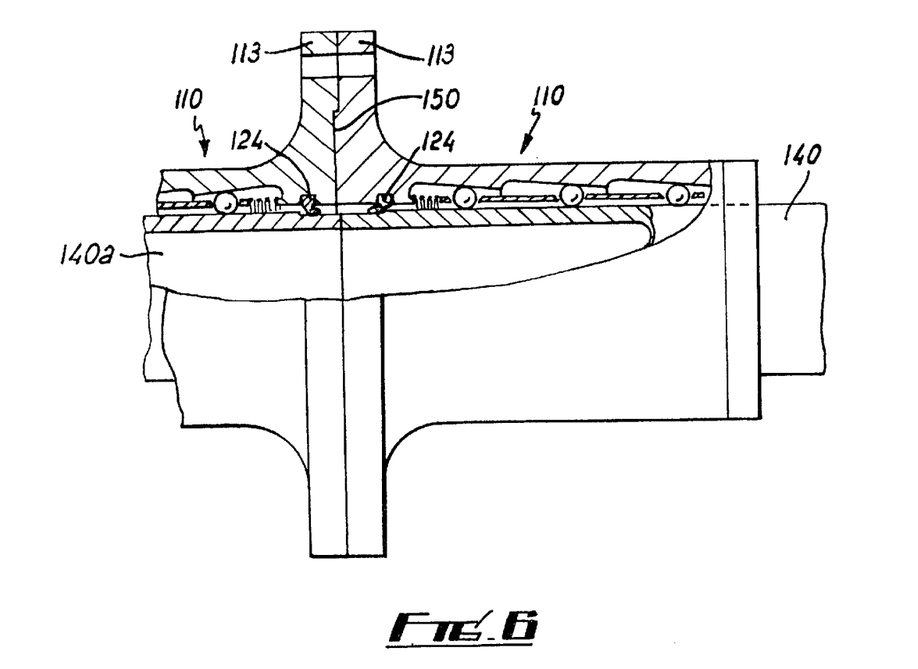
FIG. 6 is similar to FIG. 5 showing a modified arrangement.

As shown in FIG. 6, there may be two connectors 110 with abutting flanges 113 (flange 114 omitted) so as to connect or couple two pipes 140, 140a. In a further arrangement the connector of FIG. 6 has an integral flange 113 so that there is no junction 150.

Figure 7:
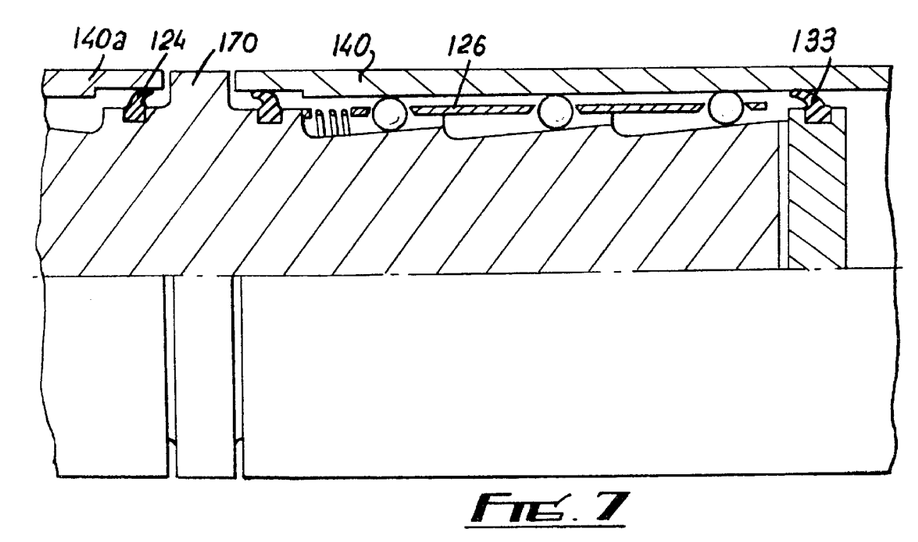
FIG. 7 is an axial section of a further embodiment.

As shown in FIG. 7, the pipe 140 can be radially outside the tapered surfaces. There is shown an optional location spigot 170.

Figure 8:
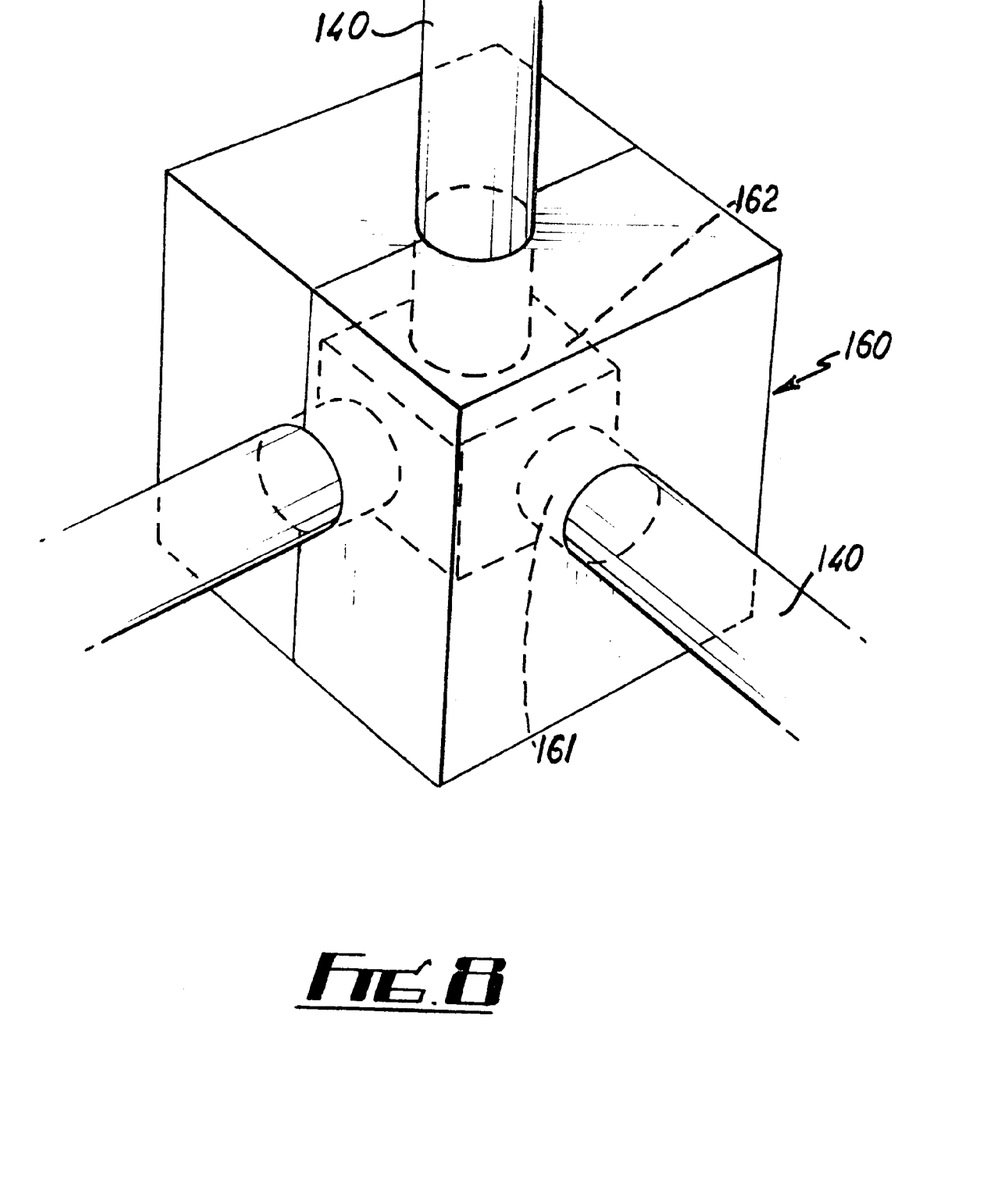
FIG. 8 shows a connection manifold.

As shown in FIG. 8, the cylinder 112 can take the form of a block 160 e.g. square or rectangular, having several bores or ports 161, each machined to provide taper surfaces with cage and balls, as above, so that several pipes can be secured in the block, which acts as a connection manifold, so that several pipes are connected in close proximity to each other and with a central manifold zone 162.

When the pipe 140 is pressurized internally it is subject to the pressure of balls 129, the balls may swage the pipe due to the action of the balls on the hardened faces 116, 117, 118, reducing ovality.

Figure 9:
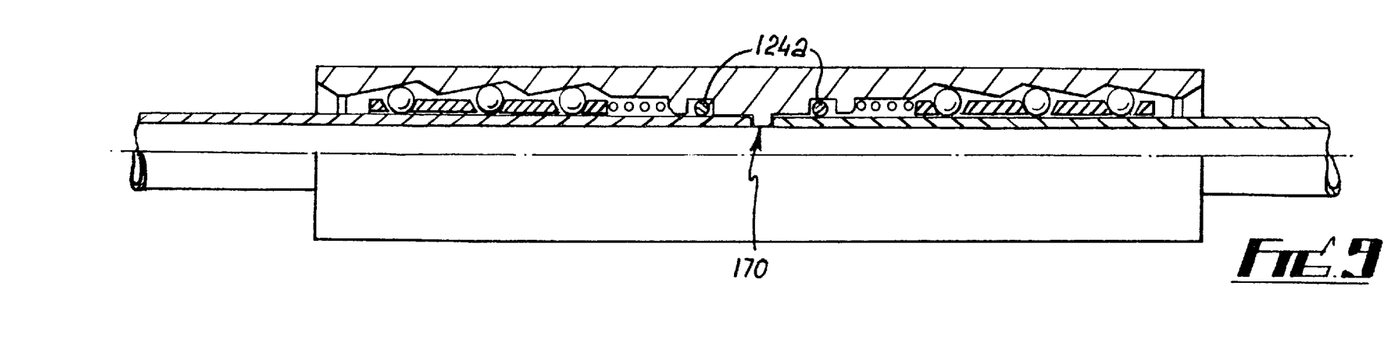
FIG. 9 shows another arrangement.

FIG. 9 shows an arrangement similar to FIG. 6 but seals 124 are in the form of resilient O-rings 124a and, in the form shown, caps 130 are omitted. Again the inner ends of the pipes may abut a spigot 170, or the spigot is absent and the pipes abut each other.

Figure 10:
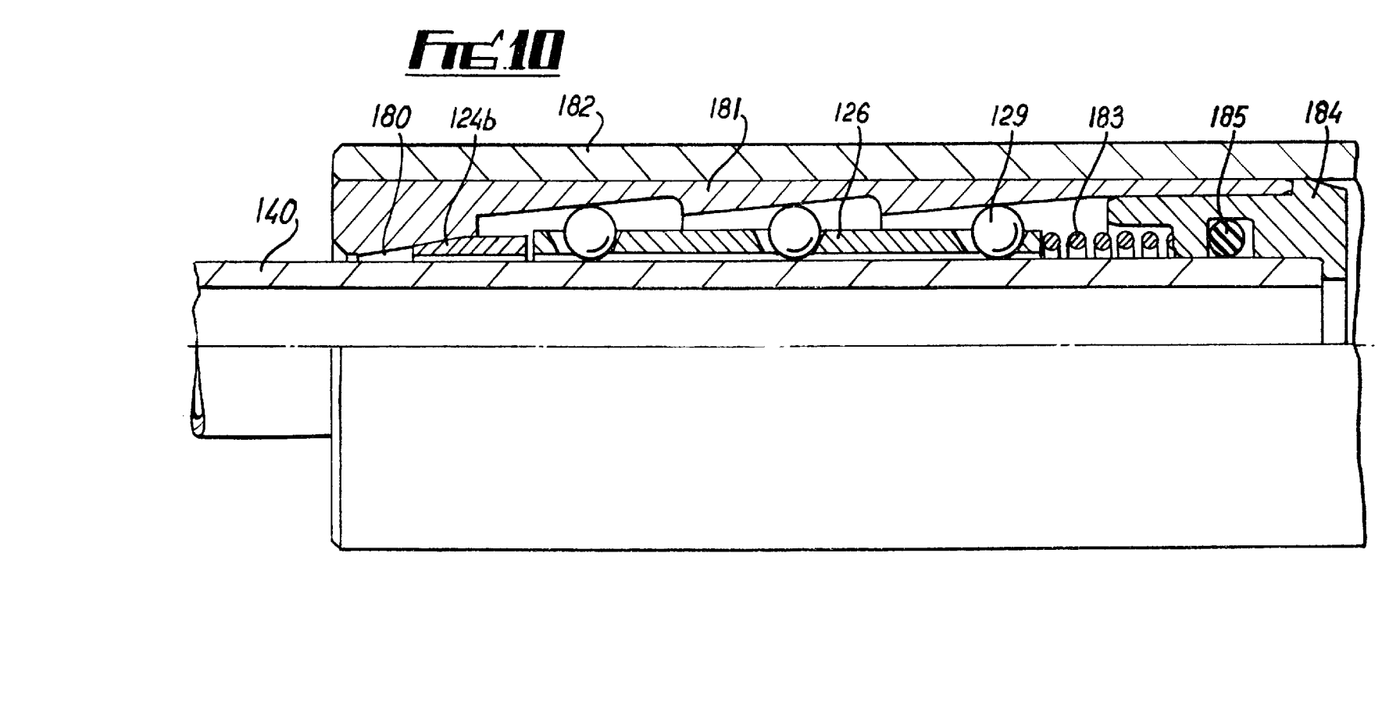
FIG. 10 shows an axial section of half a further coupling.

In the arrangement of FIG. 10 the coupling has an O-ring primary seal 185 and a metal secondary seal 124b.

When axial pressure is applied to the pipe during insertion of the pipe into the connector the balls 129 swage the pipe, in a similar manner to the arrangements already mentioned, until all the axial clearance is taken up between the ball retaining sleeve 126 and the metal seal 124b. Further internal pressure in the pipe now pushes the ball retaining sleeve onto the annular metal seal 124b which is pushed into a conical taper 180 thus swaging the metal seal onto the pipe.

The taper surfaces are formed on a sleeve 181 which may be a shrink fit in the body 182 of the fitting.

To assemble the fitting the metal seal is placed into the taper sleeve 181 followed by the ball retaining sleeve 126 complete with balls. The spring 183 is then placed into the taper sleeve and O-ring seal retaining housing 184 complete with O-ring seal 185 may then be pressed into the taper sleeve 181.

The housing 184 provides a locating spigot 186 for the end of the pipe 140.

The sub-assembly consisting of items 129, 126, 124b, 181, 184, 185, 183 may now be shrunk into the body of the fitting 182. Again the apertures 127 may have a greater axial dimension than angular or circumferential dimension.

The housing 184 engages the outer surface of the pipe, the inner surface of the fitting 182 and the inner surface of the end region of sleeve 181 and abuts the end of the sleeve 181 and provides an annular groove for receipt of the O-ring. In the case shown the spring 183 is at the axially inner end of the sleeve 126.

If for example the fitting were a straight coupling, two sub-assemblies would be required one at each end of the body or for a T-fitting three sub-assemblies would be required.

It will be understood that if the pipe 140 is removed the balls do not drop out but are retained by the support 126.

Figure 11:
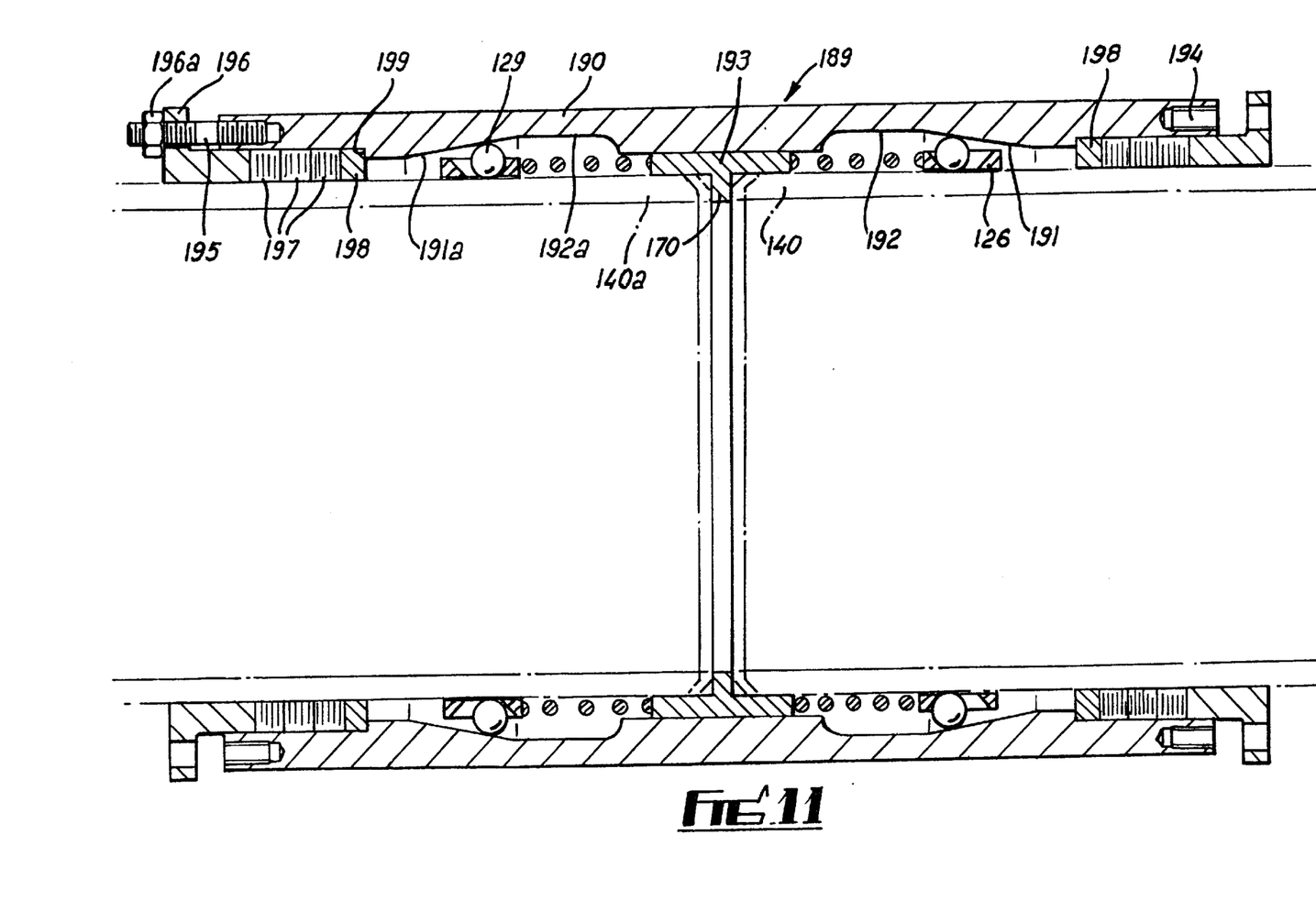
FIG. 11 is a longitudinal section through another embodiment.

In the arrangement of FIG. 11 a pipe coupling 189 has a cylindrical member 190 inner bore defining two tapered surfaces 191, 191a leading to axial portions 192, 192a in which the balls 129 can locate and not press on pipes 140, 140a. A central annular element 193 provides locating spigot 170 and each tapered surface cooperates with a single set of balls 129. The ends of the member 190 have angularly spaced axially extending threaded recesses 194 for receiving bolts 195 (only one shown) with nut 196a to hold end flanges 196 against annular packing rings 197 which abut metal ring 198 abutting shoulder 199. The rings 197 seal against the pipe. The apertures in the cage 126 may be axially elongated to accommodate a degree of ovality.

The arrangements described can be used to connect one or more pipes to other structure or one or more pipes together and may be used as a pipe clamp. Thus the device of FIG. 5 can be attached to a lifting mechanism, lowered on to a vertical pipe—the balls moving into zones 119, 120, 121, and then lifted so that the balls move on to the tapered surfaces and grip the pipe which can then be lifted.

I claim:

1. A clamp for gripping elongate members, and capable of accommodating ovality of the elongate members, comprising a body having an axis and providing a surface inclined to the axis at an acute angle, movable elements which extend through apertures in a support for the elements for operative engagement with the inclined surface and with a generally axially extending surface of an elongate member such that in use said movable elements lie between said inclined surface and said elongate member surface for engagement therewith by generally radially opposite portions of the movable elements, said inclined surface being oriented such as to increasingly resist axially separating movement of the elongate member relative to the clamp body by exerting a wedging force against said movable elements into gripping engagement with said elongate member surface, said movable elements being in continuous contact with said inclined surface and said elongate member surface during gripping of the elongate member to the clamp body, the support being spaced from the body and from the elongate member, the apertures being shaped to permit both axial and radial movement of the elements relative to the support for accommodating ovality of the elongate member when the movable elements move relatively along said inclined surface into gripping engagement with the surface of the elongate member, the movable elements being free to move axially within the support apertures and relative to each other a sufficient amount such that the respective movable elements may adopt differing radial and axial positions when gripping the elongate member to accommodate such ovality.

2. A clamp as claimed in claim 1, in which the apertures have diverging walls as viewed in longitudinal section.

3. A clamp as claimed in claim 1, in which the apertures are of greater axial dimension than transverse dimension.

4. A clamp as claimed in claim 1, in which the body provides recesses for receiving the movable elements when not engaging the inclined surface.

5. A clamp as claimed in claim 1, in which each movable element is a spherical ball.

6. A clamp as claimed in claim 1, comprising a plurality of axially spaced sets of said movable elements, each set comprising a plurality of angularly spaced movable elements.

7. A clamp for gripping elongate members, and capable of accommodating ovality of the elongate members, comprising a body having an axis and providing a surface inclined to the axis at an acute angle, movable elements which extend through apertures in a support for the elements for operative engagement with the inclined surface and with a generally axially extending surface of an elongate member such that in use said movable elements lie between said inclined surface and said elongate member surface for engagement therewith by generally radially opposite portions of the movable elements, said inclined surface being oriented such as to increasingly resist axially separating movement of the elongate member relative to the clamp body by exerting a wedging force against said movable elements into gripping engagement with said elongate member surface, said movable elements being in continuous contact with said inclined surface and said elongate member surface during gripping of the elongate member to the clamp body, the support being spaced from the body and from the elongate member, the apertures being shaped to permit both axial and radial movement of the elements relative to the support for accommodating ovality of the elongate member when the movable elements move relatively along said inclined surface into gripping engagement with the surface of the elongate member, the movable elements being free to move axially within the support apertures and relative to each other a sufficient amount such that the respective movable elements may adopt differing radial and axial positions when gripping the elongate member to accommodate such ovality, and wherein spring means are provided for urging the movable elements into engagement with the inclined surface.

8. A clamp as claimed in claim 7, comprising at least one annular sealing means for engaging the member.

9. A clamp as claimed in claim 8, in which one seal engages an inclined surface so that axial movement of the seal moves the seal radially into engagement with the elongate member.

10. A clamp as claimed in claim 7, said body providing two said inclined surfaces and movable elements, said surfaces being oppositely inclined.

11. A clamp as claimed in claim 7, in which each movable element is a spherical ball.

12. A clamp as claimed in claim 7, comprising a plurality of axially spaced sets of said movable elements, each set comprising a plurality of angularly spaced movable elements.

13. A clamp as claimed in claim 7, in which the apertures are of greater axial dimension than transverse dimension.

* * * * *